United States Patent [19]
Lievense et al.

[11] Patent Number: 6,159,525
[45] Date of Patent: *Dec. 12, 2000

[54] EDIBLE FAT-SPREAD

[75] Inventors: Lourus Cornelis Lievense; Gert W. Meijer; Gerald Patrick McNeill, all of Vlaardingen, Netherlands

[73] Assignee: Van Den Bergh Foods Co., division of Conopco, Inc., Lisle, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/749,122

[22] Filed: Nov. 14, 1996

[30] Foreign Application Priority Data

Nov. 14, 1995 [EP] European Pat. Off. ............... 95203111

[51] Int. Cl.$^7$ .................................................... A23D 7/00
[52] U.S. Cl. ........................................... 426/603; 426/607
[58] Field of Search ..................................... 426/607, 603

[56] References Cited

U.S. PATENT DOCUMENTS

| | | | |
|---|---|---|---|
| 5,070,104 | 12/1991 | Pariza et al. | |
| 5,208,356 | 5/1993 | Pariza et al. | |
| 5,374,438 | 12/1994 | Yost | 426/804 |
| 5,374,440 | 12/1994 | Chedid | 426/804 |
| 5,378,490 | 1/1995 | Wheeler | 426/804 |
| 5,380,538 | 1/1995 | Wheeler | 426/804 |
| 5,382,440 | 1/1995 | Sullivan | 26/804 |
| 5,411,756 | 5/1995 | Wheeler | 426/804 |

FOREIGN PATENT DOCUMENTS

| | | |
|---|---|---|
| 406276939A | 3/1993 | Japan. |
| 1282786 | 7/1972 | United Kingdom. |
| 1577933 | 2/1977 | United Kingdom. |
| 94/16690 | 8/1994 | WIPO. |

OTHER PUBLICATIONS

Gunstone 1983 Lipids in Foods Chemistry, Biochemistry and Technology p. 152–154.
Shantha 1992 JAOCS 69(5) 425–428.
Ha 1989 J. Agric. Food Chem 37: 75–81.
Patton 1976 Biomedical Aspects of Lactation Pergamon Press, New York p. 8.
Hui 1996 Baileys Industrial Oil and Fat Products 5$^{th}$ edition vol. 1 p. 444–453.
Watt 1963 Composition of Foods p. 134. US Dept of Agriculture—Agriculture Handbook No. 8.
Gunstone 1983 Lipids in Foods Chemistry, Biochemistry and Technology Pergamon Press New York p. 147.
Chemical Abstracts 131629x (vol. 122, No. 11) This is an English Abstract of JP–A–06,276,939.

*Primary Examiner*—Carolyn Paden
*Attorney, Agent, or Firm*—Edward A. Squillante, Jr.

[57] ABSTRACT

An edible fat spread is provided that comprises triglyceride fat the fatty acid residues of which include 0.05–20 wt % conjugated linoleic acid (CLA) residues. The spread has sensoric properties as good as corresponding spreads without CLA and can be used as a normal part of a daily diet while it can contribute to obtaining an improved blood lipid profile.

10 Claims, No Drawings

EDIBLE FAT-SPREAD

FIELD OF THE INVENTION

The invention relates to an edible fat spread. More particularly, the invention relates to a fat spread having an effective form of conjugated linoleic acid.

BACKGROUND OF THE INVENTION

Fatspreads are products containing a fat phase and often also an aqueous phase. Fat continuous examples of such fatspreads are plastic shortenings, margarines, butter and reduced fat variants of margarine and butter. In such fat-continuous products the fat phase comprises oil in the liquid state and a network of fat crystals, which largely determine the rheological properties of the product. Spreads having a continuous aqueous phase and a dispersed fat phase that have plastic rheology and are suitable for spreading e.g. on bread or toast, are known as well. Also bi-continuous spreads have been developed. If the spread has a continuous aqueous phase, the aqueous phase is structured with hydrocolloids, e.g. gums and/or modified starches to obtain plasticity. The invention also relates to a process for preparing the edible fat spread.

In 1979 it was found that uncooked and pan-fried ground beef can have antimutagenic activity. (Cancer Lett. (1979), 7, 63–69). In 1987 it was reported that the active substance were isomers of conjugated linoleic acid (CLA). This activity of CLA was confirmed in that inhibition of mouse skin carcinogenesis was observed (Carcinogenesis, (1987), 8(12), 1881–1887. It was further found that mammary tumors in rats and mouse forestomach neoplasia are suppressed by dietary CLA (Cancer Res. (1991), 51(22), 6118–6124 and Cancer Res. (1990), 50, 1097–1101). In the article it was suggested that the active form of CLA is CLA incorporated in phospholipid.

Work continued, studying the underlying mechanisms and aiming to put the findings to practical use. U.S. Pat. No. 5,208,356 reports amongst other things anti-oxidant activity of CLA.

A strong preference is expressed for CLA incorporated into phospholipid. U.S. Pat. No. 5,070,104 reports that CLA is effective for chelating metals. The preferred forms of CLA are CLA itself, methyl and ethyl esters and sodium and potassium salts of CLA. Chelating metals can be put to use both in vivo and in vitro. For in vivo application, pharmaceutical composition comprising an active form of CLA, notably non-toxic salts, are disclosed.

Recently, it was further reported that including CLA in the diet of rabbits and hamsters can have a beneficial effect on the blood lipids profile: it reduces the content of total cholesterol, LDL cholesterol and triglycerides without adverse effect on HDL cholesterol (Atherosclerosis (1994), 108, 19–25 and Circulation Suppl I (1993), 88, 45)

SUMMARY OF THE INVENTION

An edible fat spread containing a fat phase and optionally an aqueous phase is described. The fat of the fat phase comprises triglycerides of fatty acid residues of which 0.05–20% by weight consist of conjugated lineolic acid residues and of which at most 50% by weight consist of saturated and trans-unsaturated fatty acid residues, other than conjugated linoleic acid.

DETAILED DESCRIPTION OF THE PREFERRED EMBODIMENTS

We have now found that a beneficial effect with respect to the bloodlipids profile can be obtained using CLA with the diet, but using a form in which the CLA becomes an integral part of the diet. According to our invention the CLA containing composition is not an addition to the regular diet which raises caloric intake but a normal constituent of the diet wherein CLA replaces fat. Furthermore, many consumers do not wish to take medicine-like products or dietary supplements on a regular basis. Yet, cardio vascular disease, for which the blood lipid profile is a risk indicator, is one of the main causes of death in affluent societies. Many people, also many of those who do not have an identified elevated risk of heart failure, would benefit from an improved blood lipids profile. However, such consumers typically do not accept products that provide a health benefit as part of their daily diet, unless such products do not in any way detract from the pleasure derived from using and eating the product.

We found a way to obtain beneficial effects on blood lipids by means of a product that constitutes a normal part of a regular diet and thus does not add calories and that is in no way less attractive in sensorically perceivable properties than conventional products of the same type that do not have the favourable effect on blood lipids. Accordingly, the invention provides an edible fat spread containing a fat phase and optionally an aqueous phase, wherein the fat of the fat phase comprises triglycerides of fatty acid residues of which 0.05–20% by weight consist of conjugated linoleic acid residues, and of which at most 50% by weight consist of saturated and trans unsaturated acid residues other than CLA.

Much resource has been devoted to analysis of CLA contents in foodproducts. Although there is much controversy about the accuracy and reliability of the results of the analyses, there seems to be consensus that the highest levels of CLA are found in foodproducts of which the fat originates from ruminants e.g. beeffat and milkfat. Furthermore, within this group, the highest levels seem to be found for the type of products that are subjected to substantial heating during their preparation, notably processed cheese and grilled ground beef. For example, J. Agri Food Chem. 37(1), (1989), 75–81, reported that ground beef contained 562 ppm of CLA while grilled ground beef contained 998 ppm of CLA. The CLA content of different cheeses ranged form 169 ppm to 1815 ppm, while the CLA content of whole milk was 28 ppm. Calculated with respect to the fat, the variation in this group of products of which the fat originates from ruminants, was smaller: from 550 to 9290 ppm CLA for blue cheese and grilled ground beef, respectively. JAOCS 69(5), (May 1992), 425–428 reports CLA contents of a variety of processed cheeses between 3.2 and 8.9 mg/g fat.

From the above cited literature it appears that the presence of 0.05 en % of CLA in the diet is sufficient to get notable health benefits e.g. with respect to blood lipids levels (although in some studies substantially higher dosages have been applied). If this is so, in view of the above given analysis, it would be expected that the CLA present in dairy and beef products, considering the amounts in which they are generally consumed, is sufficient to reduce blood cholesterol levels. Yet, this is not so. To the contrary, it is widely accepted that, in order to reduce blood cholesterol levels, consumption of beef and dairy fat should be reduced rather than increased. There seem to be two possible explanations for this apparent paradox:

The above analyses of beef and dairy products do not allow drawing conclusions about the form in which CLA is present. It can be hypothesized that only CLA in a particular form, e.g. as free CLA or in phospholipid form is effective. Most studies on in vivo effects were done with CLA present as free acids. The literature recommends to use CLA e.g. in the form of phospholipid, free CLA or sodium or potassium salts.

The CLA in beef and dairy products does have a favourable effect, but this is overshadowed by the adverse effects of the other constituents of beef and dairy fat. Beef and dairy fat predominantly consist of saturated and trans-unsaturated (other than CLA) fatty acid residues.

We have found that CLA in the form of triglycerides can be effective in improving the blood lipids profile. Furthermore, in our product the amount of saturated and trans unsaturated fatty acid residues other than CLA is less than 50%, calculated on the fat of the product.

Preferably, the content of saturated and trans-unsaturated fatty acid residues other than CLA is substantially lower, e.g. less than 40%, more preferably less than 30%, and most preferably less than 25%.

For example, to provide on average 0.05 en % of CLA in the diet, for a typical diet, an amount of about 1% CLA-residues in the fat of a spread containing 60% fat phase and 40% aqueous phase would be appropriate.

Incorporating such an amount in the form of phospholipid ester would correspond to about 3% of phospholipid calculated on the amount of fat. We found that incorporating such an amount of the phospholipid in the spread has a quite noticeable negative effect on the mouthfeel and melting behaviour of the product and its flavour release. We further found that including 1% CLA as free acid had a perceivable adverse effect on the taste of the product. Such free acid we found, also affects the keepability of the product. It enhanced hydrolysis and development of rancidity, which are clearly undesirable phenomena. Using CLA in the form of salts such as sodium and potassium salts, had a strong negative effect on the taste of the product even at much lower levels than 1%. No such adverse effects on the sensorically perceivable product properties are observed when incorporating the CLA as fatty acid residues esterified in triglycerides.

A further advantage of the invention is that the amount of CLA incorporated can easily be adjusted within wide ranges, depending on the product design and eating habits and medical condition of particular consumer groups. Preferably however the content of CLA residues in the fatty acid residues of the fat is 0.1–15%, more preferably 0.5–10%.

Preferably the CLA residues of the product comprise at least 50%, more preferably at least 75% of residues of the 9,11 octadecadienoic acid and/or 10,12 octadecadienoic acid isomers. It is further preferred that at least 50%, more preferably at least 75% of the CLA residues are residues in which 1 double bond is in the cis configuration and 1 double bond is in the trans configuration. It is particularly preferred that the CLA residues comprise at least 40% especially at least 50% and most preferably at least 60% of 9-cis, 11-trans octadecadienoic acid isomer residues.

Triglycerides having CLA esterified therein can suitably be prepared by converting a mixture of free fatty acids containing linoleic acid into an acid mixture comprising CLA acids e.g. as described in Cancer Research, 51, (1991), 6118–6124 and then incorporating the CLA acids into triglycerides e.g. as described in GB 1,577,933.

The fat of the fat spread preferably consists of a CLA-rich triglyceride mixture combined with commonly used oils or fats or fat-components. The CLA-rich triglyceride mixture, e.g. prepared as described above, preferably comprises 10–50%, especially 20–40% of CLA residues in the triglycerides, calculated on the weight of the total amount of the fatty acid residues. The other oils or fats preferably comprise liquid oil, i.e. oil that contains no solid fat at 200° C., preferably at 15° C. Examples of such liquid oils are sunflower oil, safflower oil, low erucic acid rapeseed oil, linseed oil, soybean oil, cottonseed oil, high oleic acid residues containing varieties of such oils, groundnut oil, olive oil, and mixtures of two or more thereof. Unhardened marine oil, e.g. fish oil from sardines or pilchard can also be incorporated. It will further often be appropriate, e.g. when making a fat-continuous spread, to incorporate a structuring fat. In an other embodiment, it is preferred that the fat composition comprises at least 30%, and more preferred at least 45% of polyunsaturated. As such for example an interesterified mixture of a lauric fat, e.g. palmkernel stearin and a fat rich in saturated fatty acid of 16 carbon atoms chain length or longer, e.g. palm oil stearin. Structuring fats, in particular also structuring fats for spreads designed to have low contents of saturated and trans-unsaturated fatty acid residues other than CLA, are well known in the art. Such structuring fat is preferably prepared from vegetable fat. Animal fats such as beeffat, e.g. tallow and milkfat are preferably not incorporated in the product.

The CLA rich triglyceride mixture may be designed such that it behaves physically like a liquid oil, e.g. by esterifying CLA to partial glycerides, e.g. diglycerides, the fatty acids of which are largely unsaturated, e.g. a partial glyceride mixture prepared from low erucic acid rapeseed oil. Alternatively, the CLA rich triglyceride mixture can be made to become a structuring fat, e.g. by esterifying CLA to a partial glyceride mixture of palm oil stearin. Whatever form of CLA rich triglyceride mixture is employed, the overall fat composition can be adapted to obtain a fat suitable for making a spread by adjusting the types and amounts of (other) liquid oil and/or structuring fat used in the composition to make up the total fat to be incorporated in the product. Methods to do so are well known in the art.

Preferably the composition of the fat is chosen such that it comprises at least 20%, more preferably at least 30%, especially at least 40% of all-cis polyunsaturated fatty acid residues (PUFA) e.g. residues of linoleic acid, $\alpha$- and/or $\gamma$ linolenic acid, EPA and/or DHA.

The spread may be a water continuous spread. In such products it may not be necessary to include any structuring fat, although generally the presence of some structuring fat is usually beneficial to obtain optimal product quality.

Preferably the product is a fat continuous spread, however. Particularly preferred fat continuous spreads are margarines (80–83% fat), so-called halvarines (35–45% fat) and spreads with a fat content in between these two product types.

The composition of the fat is preferably chosen such that the solid fat content as a function of temperature and measured by NMR as is well known in the art, using stabilisation of at least 10 minutes at a temperature of 60° C. or higher, 60 minutes at 0° C. and 30 minutes at measuring temperature, is as follows:

$N_{10}$: 7–55, more preferably 7.5–50

$N_{20}$: 4–33, more preferably 4.5–30

$N_{30}$: 0–13, more preferably 0.5–10

$N_{35}$: max 5, more preferably 0–4

It is particularly preferred for the N-values to be:

$N_{10}$: 8–25

$N_{20}$: 4.5–12

$N_{30}$: 0.5–6

$N_{35}$: 0–3

The fat continuous spread need not contain an aqueous phase. It can for example be a shortening suitable for cooking and baking. Preferably however the spread comprises 85–20% fat phase and 15–80% aqueous phase, more preferably 83–35% fat phase and 17–65% aqueous phase.

The fat phase of the product may comprise apart from triglyceride fat, small amounts of other ingredients e.g. emulsifier, colourant, flavour, vitamins e.g. vitamin E, etc. The aqueous phase if any, may comprise apart from water, milk constituents e.g. milk protein powder, food acid, salt, flavour, preservatives, gelling and/or thickening agents etc.

The invention also encompasses a preferred process for preparing the present edible spread wherein:

- free CLA is incorporated into triglycerides to obtain a CLA rich triglyceride mixture
- the CLA rich triglyceride mixture is combined with triglyceride fat to obtain a fat blend
- a fat phase composition is prepared that includes as fat the fat blend
- the fat phase composition is subjected to processing, optionally in combination with an aqueous phase composition, to obtain the spread.

Throughout this specification, the terms oils and fats are used interchangeably. Percentages, parts and proportions are by weight unless indicated otherwise. Amounts of fatty acids residues of a fat are expressed with respect to the total fatty acid residues of the fat. The expressions "comprises" and "comprising" encompass "consists of" and "consisting of".

N-values can be measured as described in Fette, Seifen Austrichmittel, 80, (1978), 180–186. The fatty acid composition of fats can be measured by GLC e.g. as described in EP 78568. The composition of the isomers of CLA and the total amount of CLA residues, can be determined by FAME GLC e.g. as described in J. Agri. Food Chem. 37, (1989), 75–81.

Spreads can be produced e.g. as described in "Margarine" by Anderson and Williams; Pergamon Press (1965).

EXAMPLE I

A CLA rich triglyceride mixture was prepared as follows: A commercially available mixture of free fatty acids having a linoleic acid content of 95.3% was added to a solution of NaOH in ethylene glycol. The mixture was heated to 18° C. under an inert atmosphere for 2 hours. The reaction mixture was cooled and the pH adjusted to 4 with HCl. The mixture was extracted with hexane. The extract was washed with an NaCl solution and dried over NaSO4. The hexane was removed by evaporation. The product contained 90% CLA and consisted mainly of 9 cis, 11 trans and 10 trans, 12 cis CLA isomers in approximately equal amounts. 3 Parts of this acid mixture was mixed with 10 parts palm oil. Immobilised Mucor miehei lipase was added and the mixture was gently stirred for 48 hours while it was kept at 45° C. Then the lipase was removed by filtration and the free fatty acid was removed by washing with aqueous methanol. The CLA rich triglyceride mixture thus obtained was refined using conventional methods. Its free fatty acid content was less than 0.1%. The fatty acid residue composition of the triglycerides was:

| | |
|---|---|
| 0.3% | C12 |
| 0.8% | C14 |
| 32.6% | C16 |
| 3.6% | C18 |
| 32.9% | C18:1c |
| 12.5% | C18:2cc (linoleic acid) |
| 7.6% | 9 cis, 11 trans-CLA isomer |

| -continued | |
|---|---|
| 8.1% | 10 trans, 12 cis-CLA isomer |
| 0.6% | other CLA isomers |
| 0.2% | C20 |
| 0.1% | C20:1c |
| 0.7% | other fatty acids |
| Trans other than CLA: | <1% |
| SAFA | 38% |
| CLA | 16.3% |
| PUFA | 12.5% |

8 Parts of this mixture is blended with 79 parts refined sunflower oil and 13 parts of a refined interesterified mixture of 50 parts fully hardened palm oil and 50 parts fully hardened palm kernel oil.

The resulting fat blend, has the following fatty acid residue composition:

| | |
|---|---|
| 0.7% | C8 + C10 |
| 3.4% | C12 |
| 1.2% | C14 |
| 10.2% | C16 |
| 8.4% | C18 |
| 18.0% | C18:1c |
| 55.1% | C18:2cc (linoleic acid) |
| 0.61% | 9 cis, 11 trans CLA isomer |
| 0.65% | 10 trans, 12 cis CLA isomer |
| 0.05% | other CLA isomers |
| 0.3% | C20 |
| 1.4% | other fatty acids |
| Trans other than CLA | <1% |
| SAFA | 25% |
| CLA | 1.3% |
| PUFA | 55% |

To 70 parts of this fatblend, 0.1 part soybean lecithin, 0.1 part monoglyceride and a small amount of β-carotene solution are added.

To 29 parts water, 0.5 part whey protein powder, 0.1 part salt, a small amount of flavour, and citric acid to obtain a pH of 4.5 are added.

70 parts of the fat phase composition and 30 parts of the aqueous phase composition are mixed and kept at a temperature of 55° C. The mixture is passed through a Votator line with 2 scraped surface heat exchangers (A-units) and 1 stirred crystallizer (C-unit) operating at 100 rpm. The product leaving the C-unit has a temperature of 11° C. It is filled into tubs and stored at 5° C. A good fat continuous spread is obtained. It contains 1.3% CLA residues calculated on the fatty residues of the product which corresponds to 0.87% CLA residues on the total product.

EXAMPLE II

Male F1B hybrid Syrian (golden) hamsters were fed semipurified diets containing 0.01 w/w cholesterol and 30 percent of energy (en %) as fat for eight weeks. The dietary fat in diet 'A' contained 12.2 en % saturated fat, 10.8 en % monounsaturated fat, and 7.0 en % polyunsaturated fat (PUFA; mainly linoleic acid (LA)). In diet 'B' 1.5 en % of the linoleic acid was replaced by conjugated linoleic acid (CLA) and incorporated into a triglyceride according to the procedure as described in Example I. At the end of the dietary period blood samples were collected for analysis of total, HDL and LDL cholesterol. In Table 1, the data on cholesterol (mmol/L) in blood (means and number of animals/analyses (n)) are provided.

TABLE 1

| Parameter | A LA | B CLA | n* |
|---|---|---|---|
| Total cholesterol | 3.67 | 3.45 | 30 |
| HDL-cholesterol | 1.55 | 1.43 | 15 |
| LDL-cholesterol | 1.08 | 0.83 | 15 |

*Each figure is the mean obtained from 30 different animals; in case n = 15, samples have been pooled from 2 animals on the same diet.

On average in the CLA-group ('B') total cholesterol was 5.9% lower than in the control group ('A'). LDL-cholesterol was 22.9% lower and HDL-cholesterol was 7.8% lower. Overall it can be concluded that CLA incorporated into a triglyceride positively contributes to the bloodlipids profile.

What is claimed is:

1. Edible fat spread containing a fatphase and optionally an aqueous phase, wherein the fat of the fatphase comprises triglycerides of fatty acid residues of which 0.05–20% by weight consist of conjugated linoleic acid (CLA) residues and of which at most 50% by weight consist of saturated and trans-unsaturated fatty acid residues, other than CLA.

2. Spread according to claim 1 wherein the fat comprises 0.5–10% CLA residues.

3. Spread according to claim 1 wherein the CLA residues comprise at least 50% residues of the 9,11 octadecadienoic acid and/or 10,12 octadecadienoic acid isomers.

4. Spread according to claim 1 wherein at least 50% of the CLA residues are residues in which 1 double bond is in the trans configuration and 1 double bond is in the cis configuration.

5. Spread according to claim 1 wherein the CLA residues comprise at least 40% 9-cis, 11-trans octadecadienoic acid isomer residues.

6. Spread according to claim 1 wherein the combined amount of saturated and trans-unsaturated fatty acid residues other than CLA, of the fat is less than 40%.

7. Edible fat spread containing a fatphase and optionally an aqueous phase, where the fat of the fatphase comprises triglycerides of fatty acid residues of which 0.05–20% by weight consist of conjugated linoleic acid (CLA) residues and of which at most 50% by weight consist of saturated and trans-unsaturated fatty acid residues, other than CLA, and wherein said edible fat spread is substantially free of CLA in the form of salts.

8. Process for preparing an edible fat spread containing a fatphase wherein the fat of the fatphase comprises triglycerides of fatty acid residues of which 0.05–20% by weight consist of conjugated linoleic acid (CLA) residues and of which at most 50% by weight consist of saturated and trans-unsaturated fatty acid residues, other than CLA which comprises sequentially:

incorporating the free CLA into triglycerides to obtain a CLA which triglyceride mixture;

combining the CLA rich triglyceride mixture with triglyceride fat to obtain a fat blend;

preparing a fatphase composition that includes as fat the fat blend; and subjecting the fatphase composition to processing to obtain the spread.

9. A process according to claim 8, which comprises subjecting the fat phase composition to processing in combination with an aqueous phase composition to obtain a spread.

10. A process according to claim 8, wherein said spread further contains an aqueous phase.

* * * * *